Aug. 21, 1962 E. J. ONDECK 3,049,775
STRAND CHUCK
Filed March 23, 1959
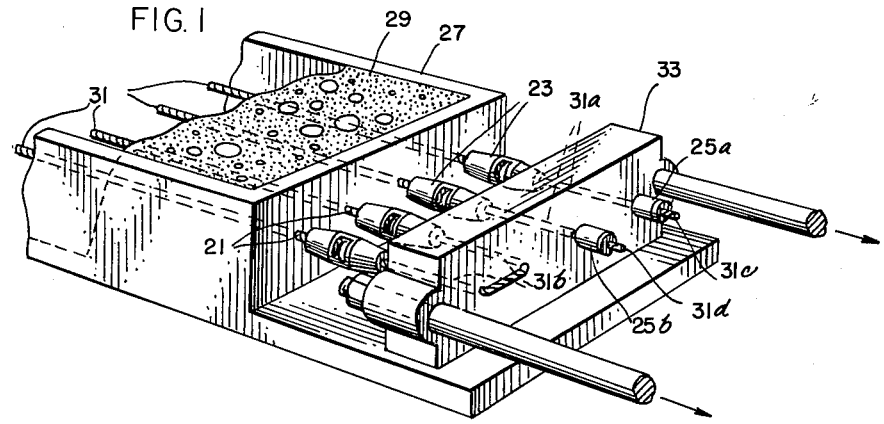
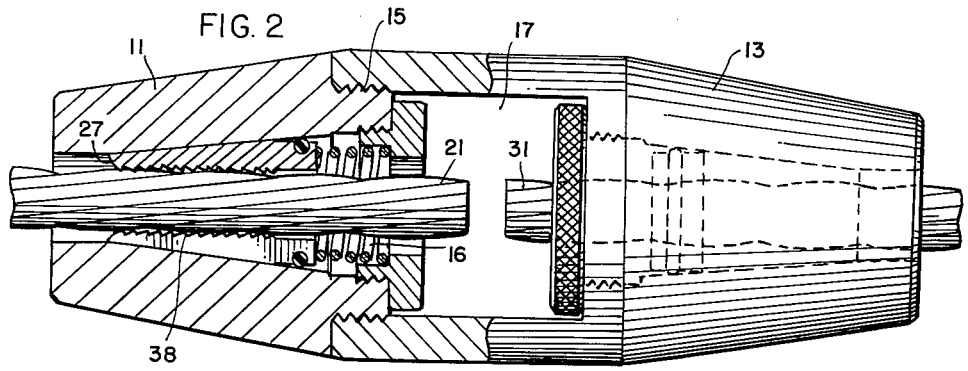
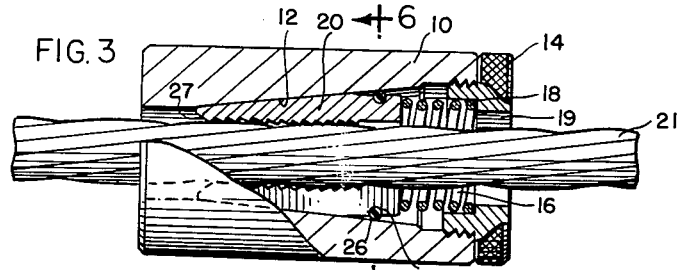
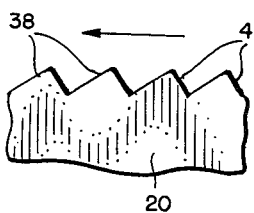
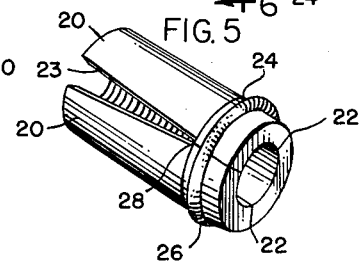
INVENTOR:
ELMER J. ONDECK
ATT'YS

United States Patent Office 3,049,775
Patented Aug. 21, 1962

3,049,775
STRAND CHUCK
Elmer J. Ondeck, North Riverside, Ill., assignor to Supreme Products Corporation, Chicago, Ill., a corporation of Illinois
Filed Mar. 23, 1959, Ser. No. 801,231
5 Claims. (Cl. 24—126)

The present invention relates to improvements in strand chucks and more particularly to chucks for line connectors and anchor grips which are repeatedly attached and released and can be moved into position and locked on braided wire without dismantling and reassemblying any part of the apparatus.

Many types of gripping devices are in use and where there are high stress requirements, the gripping means generally comprise a plurality of tapered jaws having teeth laterally disposed along the wire-contacting surfaces to grip the wire. The jaws are urged into gripping contact on the wire by a sleeve having a frustro-conical bore. As the tapered jaws move into the progressively constricted bore of the sleeve they are forced against the wire in an ever tightening grip.

Although the fundamental construction as set forth has received acceptance, problems exist and many improvements are required for reliability and satisfactory operation.

In its operation the main requirement of an anchor grip or line connector is that it be capable of withstanding and transmitting the maximum stress that can be exerted on the wire without slipping or breaking the wire. Placing the conventional anchor grip or line connector on the wire demands time and great care to assure that the jaws are evenly spaced circumferentially about the braid and that the load exerted by the jaws on the wire is uniform from one end of the jaws to the other. This has generally been accomplished by manual adjustment of the jaws individually against the braid. Automatic adjustment has been attempted where spacers have been employed but their operation and the constricting effect of the sleeve bore reduce the opening defined by the jaws to a size much smaller than the diameter of the cable to be inserted. Then as the wire or cable strands are introduced they engage the front edge of the jaws and irregularly push them back with it. After some twisting or other manipulation of the wire, the jaws are forced open to receive the end of the wire with differing results including axial and circumferential misalignment of the jaws and of the spacers also. Here again the jaws require manipulation and the spacers merely multiply the problems because if the jaws are not aligned properly the forces exereted on the wire or wire strands are not uniform. This non-uniformity causes undesirable stress concentrations to develop in the wire and in many cases cause the fracture of the wire before its desired tension is reached. Also undue or localized wear in the chuck generally occurs which results in failures of the gripping device to hold.

The fracture of wire at loads beneath its expected stress is often also caused by the fact that the teeth in the jaw faces that are provided to grip the wire, are formed in a way that they bite into the wire slightly, cutting small depressions or grooves in the wire surface. It is known in the study of resistance of materials that each cut or groove provides a section of stress concentration which leads to a fully plastic condition around the grooves in the wire braid before its ultimate stress is reached and that this condition gradually spreads further and further into the core of the wire to cause ultimate failure.

Thus one of the objects of the present invention is to provide a line connector or anchor grip which can withstand the ultimate stress requirements of wire braid yet which will not have a damaging effect on the braid while in locked position.

Another object is to provide a strand chuck with a simple relationship for a plurality of jaws which when a wire braid is pressed against their front edges will allow the front portions of the jaws to open evenly in a radial direction to an extent that the bore defined by the jaw faces at their front edges will have a diameter equal to that of the wire braid to be inserted therein.

A further object of the present invention is to provide means which will not interfere with the aforesaid operation of the jaws yet which will maintain the jaws in axial and circumferential alignment under all conditions in which the present invention may be used and particularly during the initial and major portion of the insertion movement.

Another object is to provide an improved anchor grip or line connector which can be slidably adjusted into position on wire braid in a direction opposite to intended stress but which will immediately lock in the desired position to withstand high loads as soon as stress is applied.

Still another object of the present invention is to provide teeth disposed on the inner surfaces of the jaw face so formed that they will provide the necessary gripping component over a substantial length of the cable yet not cut grooves in the wire which develop significant sections of stress concentration.

These being the objects of the present invention, other further desirable characteristics will become evident hereinafter as the specification proceeds.

In brief, applicant's improved chuck for line connectors or anchor grips comprises a sleeve having a frusto-conical bore receiving a plurality of circumferentially spaced jaws tapered toward their front edges so as to fit snugly against the bore of the sleeve. The jaws have a circumferential groove disposed in their outer surfaces near their rear edges. Positioned in this groove is an elastic O-ring which constricts or draws the jaws into contact with each other during non-use. The rear inter-engaging face portions of the jaws in the region of the O-ring are not tapered so much, in fact may be reversely tapered so that the juncture of the front and rear interface tapered surfaces defines a pivot point with the result that the small ends of the jaws are separated or moved radially outwardly under the effort of the O-ring when free to so move. A spring urged against the back edge of the jaws and against a cap threadedly secured on the back end of the sleeve normally forces the jaws forward into the sleeve for intially clamping the jaws on the wire braid and holding the desired axial alignment of the jaws.

Moreover the teeth on the jaws minimize any cutting of the wire strands and thereby eliminate a progressive deeper biting of the teeth and possible uneven sliding of the jaws in the chuck sleeve.

So that the present invention may be more clearly presented and more easily understood, applicant now refers to the drawings in which:

FIG. 1 shows line connectors and anchor grips as might be used in pre-stressing concrete;

FIG. 2 is a longitudinal view of a line connector, the left hand portion of which is a sectional view taken along a plane cutting through the mid-section of the connector;

FIG. 3 shows an anchor grip which is also essentially a longitudinal sectional view taken along a plane cutting through the mid-section longitudinally of the assembly;

FIG. 4 is a longitudinal sectional view of the tooth construction in which the direction of stress on the wire is shown;

FIG. 5 shows a perspective view of the jaw assembly showing three radially spaced jaws in an O-ring radially disposed about their outer surfaces; and FIG. 6 is a sectional view taken along line 6—6 of FIG. 3 showing the jaws in circumferentially spaced alignment around the wire braid and the O-ring expanded.

Referring now to FIGS. 3 and 5, the sleeve 10 can be seen essentially as a cylindrical member having a frusto-conical bore 12 tapering from its rear portions toward the front. The back portion of the inner surfaces of the sleeve are threaded so as to threadedly receive cap 14 which provides easy access to the parts within the sleeve. A hole 19 is drilled concentrically in the cap 14 to allow the braid 21 to be inserted therethrough as shown. Engaged within shoulder 18 of cap 14 is a locking spring 16 extending axially toward the front of the sleeve. The front portion of the spring 16 abuts against the rear edges of the three circumferentially spaced jaws 20 having their outer surfaces tapered so that they fit the inner conical surfaces of the aforementioned sleeve. It should be noted at this point that the juncture of the rear interface surfaces 22 and the rest of the inter-contacting surfaces of the jaws 23 comprise a pivot 28 upon which the jaws can be rocked with respect to each other. Circumferentially disposed over the outer surfaces of the jaws near their rear edges is a groove 24 within which is placed an elastic O-ring 26. Thus, as the jaw assembly is maintained free from constriction by the sleeve it will normally assume the position as shown in FIG. 5 in which the bevelled rear interface portions of the jaws are in contact and the front portion of the jaws are extended outwardly and radially. A plurality of axially spaced jaw teeth 38 are ground in the jaw faces from their pivot point to the front end where the jaws are chamfered as at 27.

Referring now to FIG. 4 showing a section of the gripping teeth, it will be seen that the front or right hand face of each tooth 40 is angularly disposed from the vertical at 30° and that the right hand face of each tooth is angularly disposed from the vertical at an angle of 45°. The end portions or gripping surfaces are ground to a point between 0.002 to 0.004 inch radius. Thus the teeth which exert large stresses upon the wire braid are free of any sharp contours and the wire braid is not gouged as the jaws are forced against its surfaces in locked position. It is also appreciated that the absence of sharp tooth contours will prolong the useful life of the jaws.

When the strand chuck is not in use the locking spring 16 forces the tapered jaws forward into snug fit with the frusto-conical bore of the sleeve 10 and the bore defined by the faces of the jaws is indeed smaller than the diameter of the wire braid to be inserted. As the end of the braid is inserted and forced against the front edges of the jaws, rearward movement of the whole jaw assembly occurs in the direction of increasing diameter of the conical bore which no longer confines the front edges of the jaws in their closed position but allows the O-ring to rock the jaws on their pivot points to gradually open their front edges, during rearward movement, until the front extremity of the jaw faces define a bore equal to the diameter of the wire. Now as the braid is pushed further back into the jaws the rear portions are gradually forced apart radially in a circumferentially spaced relationship against the tension of the elastic O-ring until the braid is in the position when all the surfaces of the teeth of the jaws are in even contact therewith.

Thus, during the initial insertion of the wire braid there is little tendency for the jaws to be pushed from axial alignment because the surface of contact of the jaws against the wire braid is evenly distributed from the front edges along the chamfered portion to the teeth and because the locking spring 16 which is in compression at all times against the jaw assembly maintains the desired alignment as does the elastic O-ring.

The wire, now inserted, can be pushed back further through the hole 19 of the cap 14, without danger of jaws misalignment, until the desired position of the anchor grip on the wire is reached.

In this final positioning the outer surfaces of the jaws and inner surfaces of the sleeve are nearly in contact and thus as the braid is released from rearward exertion the locking spring 16 urges the jaws gripping the braid into contact with the conical bore surface of the sleeve and immediate initial locking of the device is achieved. As tension in the forward direction is exerted upon the wire braid the jaws are further constricted by the sleeve and further positive locking stress occurs on the braid in proportion to the tension applied.

In this connection it is essential that the elastic O-ring as a cooperating element of the jaws be fully understood and appreciated. As mentioned, with the insertion of the wire braid into the rear portion of the jaws, they expand radially from the rest position. Thus any collaring element which is to hold the jaws in radial and circumferential alignment must also be able to expand radially 360°. The elastic O-ring fulfills this requirement and also offers another particularly important advantage in which it can undergo incremental expansion at a given section which is subjected to a greater stress. This is particularly desirable for the most satisfactory operation of the preferred embodiment of the strand chuck described herein. The O-ring is held in position by tension against the outer surfaces of the jaws and therefore those surfaces in contact develop frictional resistance to movement. When the jaws expand from their rest position the O-ring must expand also. However, frictional resistance in those portions in direct contact with the jaw surfaces partially counteract the applied stress. Most of the expansion then occurs in those portions of the O-ring extending between the interfaces of the jaws. The jaws will maintain circumferential spaced alignment about the braid during its insertion even though the O-ring is not uniformly stressed, and be maintained in that relationship at all times to evenly transfer gripping stress to the wire. Other than a coil-spring, metallic collaring elements such as a C-spring cannot truly expand radially 360° in performing the function of the elastic O-ring, and consequently the jaws tend to slip about the braid and become misaligned about the braid.

With the strand chuck exerting high stress to the wire braid applicant's novel construction is most appreciated. The special tooth configuration described herebefore does not allow the teeth to embed themselves significantly into the wire strand, but to maintain their gripping hold mostly in a frictional relationship distributed along the whole extent of the gripping surfaces.

Referring now to FIG. 2 it is easily seen that a line connector can be made utilizing two outwardly facing embodiments of the already described anchor grip. To simplify manufacture and to allow for easy inspection of the inner parts the sleeve members 11 and 13 are threadedly secured together at 15. Openings 17 are provided in the sleeve connector so that those using the apparatus can easily see the position of the braid in each side of the chuck assembly.

The various embodiments of the present invention obviously have many varied uses due to their high stress capabilities and ease of operation. Applicant's improved strand chuck can be readily used in the construction of reinforced concrete beams wherein mass production methods are highly desirable to reduce costs and satisfy the demand for an ever-expanding market. The technique of making modern prestressed concrete beams and their usefulness to methods of construction are well known to the art, and thus only a brief description as to how the applicant's invention is used in this relationship is necessary so that the improvements incorporated with the present invention can be fully appreciated.

As seen in FIG. 1 reinforcing wires 31 have been laid within a mold 27. Two methods of utilizing the present invention are illustrated. Namely the left hand pair of wires 31a and 31b extending from the mold are secured each into one side of applicant's line connector. To the other side of the line connectors are secured the two ends of a U-shaped wire extending through the draw plate of a hydraulically driven tension apparatus 33. The right hand pair of reinforcing wires 31c and 31d have their extremities also extending from the mold and terminated within one side of a line connector, however, the other side of the line connector has separate wires secured therein and extending through the draw plate 19. These wires are separately secured to the draw plate by anchor grips 25a and 25b. Thus, as the draw plate is pulled in the direction as shown by the arrow heads in FIG. 1, tensile stresses are formed in the reinforcing wires 31a through 31d and 31b. Thereafter, concrete 29 of suitable consistency is poured into the mold 27 and allowed to harden. When hardening has been completed tension on the draw plate is relieved and the chucks 23 and 21 are removed. In this connection the amount of wire extending from the concrete into the chuck is waste and must be cut off. Therefore it is appreciated that by utilizing the chucks as seen in FIG. 1 the amount of waste is materially reduced, and the speed and ease in which the reinforced wires can be placed into position and stretched with confidence is greatly increased.

Although the embodiment of the present invention has been described in specific detail as to its construction and how its objects are attained, this should in no way be construed so as to limit the scope of the present invention which is commensurate with the appended claims.

What is claimed is:

1. A strand chuck comprising a sleeve having a bore defining a frusto-conical wall, a plurality of circumferentially arranged jaws mounted in said bore and correspondingly tapered so as to engage slidably with said wall, resilient means carried by said sleeve urging said jaws to the narrow end of the bore, said jaws being in engagement with one another circumferentially when disposed adjacent the narrow end of said wall, each jaw having a groove circumferentially disposed in its outer surface adjacent to the large end of said jaw aligned with each of the grooves in the other jaws, and an elastic O-ring positioned within said groove resiliently holding said jaws in circumferentially evenly spaced relationship and the grooves in alignment with one another when the jaws are moved along the bore from the narrow end to the large end of said bore by a strand inserted axially into the narrow end of the bore against the small ends of the jaws for reception within the jaws.

2. A strand chuck comprising a sleeve having a bore defining a frusto-conical wall, a plurality of circumferentially arranged jaws mounted in said bore and correspondingly tapered so as to engage said wall slidably in an axial direction in said bore, removable means carried by said sleeve including a resilient element urging said jaws toward the narrow end of the bore, each jaw having a groove circumferentially disposed in its outer surface adjacent to its large end disposed in alignment with each of the grooves in the other jaws when located adjacent to the narrow end of the bore, strand gripping means upon the inner surface of said jaws comprising annular teeth having rounded crests bordered by sides inclined to a line perpendicular to the axis of said bore of 45° upon the load side of the teeth and 30° upon the other side of the teeth, and resilient means carried in said circumferential grooves including a circumferential element in said grooves made of an elastic elastomer material to urge said jaws into contact with each other and resiliently hold the jaws into contact with each other and resiliently hold the jaws in equally spaced relationship when the jaws are moved axially in said bore by a strand inserted axially against the small ends of the jaws and are moved radially by the reception of said strand within the jaws in contact with said gripping means.

3. The strand chuck called for in claim 1 including a cap removably secured to the sleeve at the widest end of said bore supporting said resilient means in place.

4. The chuck of claim 1 in which said jaws are relieved relative to each other on their abutting sides to define a pivot point between adjacent jaws spaced from said grooves a short distance towards the small ends of the jaws about which pivot points the large ends of said jaws are urged towards each other by said O-ring and the small ends of said jaws are urged away from each other in equally circumferentially spaced relationship.

5. A strand chuck comprising a sleeve having a bore defining a frusto-conical wall, a plurality of circumferentially arranged jaws mounted in said bore and correspondingly tapered to engage said wall slidably in an axial direction in said bore, cap means secured to the sleeve at the largest end of said bore, said jaws being in close proximity to each other, resilient means interengaging the cap means and large ends of said jaws under compression to urge said jaws bodily toward said narrow end of said wall, each jaw having a recess adjacent to its large end disposed in alignment with a corresponding recess in each of the other jaws when located adjacent to the small end of the bore, gripping means upon the inner surface of said jaws comprising annular teeth having rounded crests bordered by sides inclined to a line perpendicular to the axis of said bore, means carried by said recesses including elements of an elastic elastomer material interconnecting said recesses to urge said jaws toward each other, said elastomer elements stretching to resiliently hold the jaws in equally spaced relationship when the jaws are moved axially from the narrow end to the larger end of said bore by an insertion of a strand into the narrow end of the bore axially against the small ends of the jaws and are moved radially by the reception of said strand within the jaws in contact with said gripping means.

References Cited in the file of this patent

UNITED STATES PATENTS

| | | |
|---|---|---|
| 831,548 | Fleeger | Sept. 25, 1906 |
| 889,776 | Dyer | June 2, 1908 |
| 1,547,976 | Spannois | July 28, 1925 |
| 2,040,678 | Buskirk | May 12, 1936 |
| 2,078,051 | Berndt | Apr. 20, 1937 |
| 2,554,387 | Saul | May 22, 1951 |
| 2,652,273 | Davis | Sept. 15, 1953 |
| 2,665,331 | Berndt | Jan. 5, 1954 |